United States Patent [19]

Malhotra

[11] Patent Number: 4,678,687

[45] Date of Patent: Jul. 7, 1987

[54] THERMAL TRANSFER PRINTING SHEETS CONTAINING CERTAIN COATING COMPOSITIONS THEREOF

[75] Inventor: Shadi L. Malhotra, Mississauga, Canada

[73] Assignee: Xerox Corporation, Stamford, Conn.

[21] Appl. No.: 666,702

[22] Filed: Oct. 31, 1984

[51] Int. Cl.$^4$ .............................................. B41M 5/26
[52] U.S. Cl. .................................... 427/261; 156/235; 156/240; 346/1.1; 346/135.1; 428/195; 428/483; 428/500; 428/913; 428/914
[58] Field of Search ................................ 427/261, 121; 346/135.1, 1.1; 428/195, 913, 914, 213, 216, 336, 483, 500; 156/235, 240

[56] References Cited

U.S. PATENT DOCUMENTS

| | | | |
|---|---|---|---|
| 3,037,879 | 6/1962 | Newman et al. | 117/36.1 |
| 3,617,328 | 11/1971 | Newman | 117/21 |
| 3,833,293 | 9/1974 | Serio et al. | 355/17 |
| 3,928,710 | 12/1975 | Arnold et al. | 428/483 |
| 4,028,118 | 6/1977 | Nakasuji et al. | 428/913 |
| 4,202,923 | 5/1980 | Thoese | 428/144 |
| 4,234,644 | 11/1980 | Blake et al. | 428/204 |
| 4,254,211 | 3/1981 | Scrutton et al. | 430/176 |
| 4,366,239 | 12/1982 | Shinagawa et al. | 430/533 |
| 4,370,379 | 1/1983 | Kato et al. | 428/341 |
| 4,389,473 | 6/1983 | Scrutton et al. | 430/176 |
| 4,446,174 | 5/1984 | Maekana et al. | 428/211 |
| 4,460,637 | 7/1984 | Miyamoto et al. | 346/135.1 |
| 4,474,850 | 10/1984 | Burwasser | 428/195 |
| 4,481,244 | 11/1984 | Haruta et al. | 346/135.1 |

FOREIGN PATENT DOCUMENTS

| | | |
|---|---|---|
| 54050692 | 12/1981 | Japan . |
| 1343327 | 1/1970 | United Kingdom . |
| 1306944 | 2/1971 | United Kingdom . |

*Primary Examiner*—Bruce H. Hess
*Attorney, Agent, or Firm*—E. Palazzo

[57] ABSTRACT

A process for obtaining transparencies suitable for the effective transfer of developed images from a donor sheet which comprises (1) providing a transparent substrate, and (2) applying a coating thereto selected from the group consisting of poly(vinyl ethers), poly(acrylic acid esters), poly(methacrylic acid esters), poly(vinylmethyl ketone), poly(vinylacetate) and poly(vinylbutyral).

7 Claims, No Drawings

THERMAL TRANSFER PRINTING SHEETS CONTAINING CERTAIN COATING COMPOSITIONS THEREOF

BACKGROUND OF THE INVENTION

This invention relates generally to thermal transfer printing, and more specifically the present invention is directed to the preparation of transparencies with certain selected overcoating compositions enabling their compatibility with donor sheets used in thermal transfer printing systems. In one specific embodiment of the present invention there are provided polymeric coatings for transparencies enabling the acceptable thermal transfer of images from various donor sheets, particularly those selected for use in thermal transfer printing systems. Additionally, the coatings of the present invention can be selected for various substrates that are utilized in ink jet printing apparatuses. Moreover, the transparencies prepared in accordance with the process of the present invention can be used for receiving characters from typewriters with single strike correctable ribbons.

In thermal transfer printing, there is used an ink donor film consisting generally of a thin substrate coated with a waxy ink. In operation, the inked portion of the donor film is placed in contact with a plain paper receiver sheet followed by directing heat from a thermal printhead to the film side of the donor, causing ink to melt and wet the receiver sheet. Subsequent separation of the sheets provides for the transfer of ink to the image areas of the plain paper. Various substrates are of interest for the ink donor film including highly calendered condenser papers with thicknesses of from about 10 to about 20 microns and polyester (Mylar) films. Thermal printers utilizing such materials are useful in a variety of applications including facsimile, printer plotters, and computer output printers. As office automation increases, low cost thermal printers appear to be prime candidates for communicating terminals, allowing for office quality hard copy inputs. The main advantages of these printers are reliability, clean operation, compactness, speed and low cost.

Generally, the thermal printers can be classified as direct and transfer. In the direct system, a paper having a thermally sensitive coating, either a wax or an organic metal compound is selectively heated causing color changes in the coating. In the transfer type of printer, a donor ribbon loaded with a marking material, typically a heat sensitive ink, is transported intermediate to a thermal printhead and a plain paper recording sheet. The printhead is electrically activated to selectively apply heat to the donor sheet thereby causing melting and transfer of portions of the marking material onto the paper in image configuration.

Disclosed in U.S. Pat. No. 4,273,602, are heat sensitive recording materials comprised of a support sheet of a thickness of from 5 to 40 microns having thereon a heat sensitive transfer layer with a phenolic material, a colorless or precolored material which reacts with the phenolic material to form color upon application of heat, and a heat fusible material having a melting point of 40° C. to 150° C., with an image receiving sheet superimposed on the surface of this layer. It is indicated in this patent that heat sensitive transfer layers can be formed from waxes or resins of low molecular weight, with colored dyes dispersed therein, however, apparently there are problems associated with such a method in that part of the layer transfers to ordinary paper causing undesirable staining and a decrease in contrast between letters and the background. Accordingly, the recorded letters cannot be easily read.

Also known is the preparation of transparencies by electrostatic means. There is thus disclosed, for example, in U.S. Pat. No. 4,370,379 a method for preparing an original for projection according to electrophotographic processes. More specifically, it is indicated in this patent that the conventional method for preparing a projection original for an overhead projector, (a transparent sheet), according to electrostatic photography comprises transferring a toner image formed on a photosensitive plate onto a stretched polyester film, and fixing the transferred toner image on the film by heat. Various plastic films can be used for this purpose including a biaxially stretched polyester film. It is further indicated in this patent that the transfer film selected for electrostatic photography is comprised of a film substrate which is transparent such as a biaxially stretched polyethylene terephthalate film including Mylar films. The present invention relates to the formation of similar transparencies which contain certain coatings thereover, and thus can be used in thermal transfer printing systems.

Moreover, there is disclosed in U.S. Pat. No. 4,234,644, a composite lamination film for electrophoretically toned images deposited on a plastic dielectric receptor sheet, comprising in combination, an optically transparent flexible support layer, an optically transparent flexible intermediate layer of a heat softenable film applied to one side of the support layer, wherein the intermediate layer possesses good adhesion to the support layer. It is indicated in this patent that the support layer 11 can be prepared from various suitable substances including polycarbonates, polysulfones, polyethylene terephthalates, Mylars, and the like.

While the above-described transparencies are suitable for their intended purposes, there remains a need for transparencies which are compatible with donor sheets enabling the acceptable thermal transfer of images thereto. Moreover, there remains a need for coatings for transparencies enabling their effective and efficient use in allowing images electrostatically formed to be transferred thereto. Also, there continues to be a need for coatings for transparencies which can be generated in ink jet printing systems.

SUMMARY OF THE INVENTION

It is an object of the present invention to provide improved transparencies.

Another object of the present invention resides in the provision of certain coating compositions enabling the effective transfer of images from a donor sheet to a transparency.

In yet another object of the present invention there are provided coatings for transparency sheets generated in ink jet printing systems.

In still a further object of the present invention there are provided polymeric coatings which are compatible with the coatings selected for donor sheets, and with the coatings selected for the substrates such as Mylar, enabling the preparation of suitable transparencies.

In a further object of the present invention there are provided transparencies wherein electrostatic images can be effectively transferred from a donor sheet in thermal transfer printing systems.

In a further object of the present invention, there are provided optimized transparent substrates with coatings thereover for thermal transfer printing systems.

In a further object of the present invention there are provided coatings for transparent substrates enabling the thermal transfer of images from donor sheets.

These and other objects of the present invention are accomplished by the provision of polymeric coatings for transparent substrates. More specifically, in accordance with the present invention there are provided transparent substrates with coatings thereover selected from the group consisting of poly(vinyl ethers), poly(alkyl methacrylates), and poly(alkyl acrylates) such as poly(acrylic acid esters), poly(methacrylic acid esters), and other polymers including poly(vinylmethyl ketone), poly(vinylacetate), and poly(vinylbutyral). Examples of transparent substrates selected include Mylar, commercially available from E. I. DuPont; Melinex, commercially available from Imperials Chemical Incorporated; Celanar, commercially available from Celanese; polycarbonates, especially Lexan; polysulfones; cellulose triacetates; polyvinyl chlorides; and the like, with Mylars being particularly preferred primarily in view of their availability and lower costs.

In one embodiment the present invention is directed to a process for obtaining transparencies suitable for the effective transfer of developed images from a donor sheet which comprises (1) providing a transparent substrate, (2) applying a coating to the substrate selected from the group consisting of poly(vinyl ethers), poly(acrylic acid esters), poly(methacrylic acid esters), poly(vinylmethyl ketone), poly(vinylacetate) and poly(vinylbutyral).

The transparent substrates illustrated herein are generally of a thickness of from about 50 microns to about 180 microns, and preferably of a thickness of from about 50 microns to about 70 microns. Thicknesses outside these ranges can be selected providing the objectives of the present invention are achieved.

Illustrative examples of specific coatings selected for the transparent substrate, are poly(alkyl methacrylates), and poly(alkyl acrylates), such as poly(octadecyl methacrylate), poly(hexadecyl methacrylate), poly(lauryl methacrylate), poly(isodecyl methacrylate), poly(cyclohexyl methacrylate), poly(hexyl methacrylate), poly(2-ethyl hexyl methacrylate), poly(ethyl acrylate), poly(ethyl methacrylate), and poly(methyl methacrylate), poly(methyl acrylate), poly(ethyl acrylate), poly(isopropyl acrylate), poly(butyl acrylate) and the like; poly(vinyl alkyl ethers), including poly(vinyl methyl ether), poly(vinyl ethyl ether), poly(vinyl propyl ether), poly(vinyl butyral ether) and the like; other vinyl polymers including poly(vinyl methyl ketone), poly(vinyl acetate), poly(vinyl butyral), poly(vinyl ethyl ketone), poly(styrene) and the like. These coatings can also be used as admixtures with, for example, poly(benzylmethacrylates), poly(phenyl methacrylate), poly(isobutyl methacrylate), poly(n-butyl methacrylate), poly(isopropyl methacrylate), and other similar polymers. Moreover, other mixtures of the above referred to polymers can be selected as the coatings for the substrates providing the objectives of the present invention are achieved. Examples of other specific useful mixtures include poly(octadecylmethacrylate) with poly(methylmethacrylate); poly(vinylacetate) with poly(vinylisobutyl ether); poly(vinylmethyl ether) with poly(ethylacrylate); and poly(styrene); and poly(vinylmethyl ketone) with poly(methylacrylate).

Generally, the mixtures comprise from about 40 percent to about 60 percent of one polymer, and from about 60 percent to about 40 percent by weight of another polymer.

The polymer coatings are present on the substrate in various thicknesses, generally however, this thickness is from about 1 micron to about 5 microns, and preferably from about 1 micron to about 2 microns. The coatings are applied by known methods such as by a Keegen Coater, and dip coating.

Illustrative examples of donor sheets that may be selected are well known, and include, for example, condenser paper coated with a blend of carbon and ester wax; condenser paper coated with carbon black and a polymer; and other similar donor sheets available, for example, from General Electric Company.

One specific transparency of the present invention can be prepared by providing in a thickness of from about 50 to 100 microns a substrate layer, such as Mylar, which is then coated by dip coating techniques, with the polymers described herein, in a thickness of from about 1 micron to about 5 microns. Subsequent to air drying the coating is introduced into a printer with a paper backing.

The following examples are being supplied to further define the present invention, it being noted that these examples are intended to illustrate and not limit the scope of the present invention. Parts and percentages are by weight unless otherwise indicated.

EXAMPLE I

There was prepared a coated transparency sheet by dipping entirely in a 1 percent solution of poly(vinylmethyl ether) toluene a Mylar substrate, 8"×11", and with a thickness of 50 microns. There results, subsequent to drying in air, a sheet of Mylar containing on both sides a coating, 30 milligrams, of poly(vinylmethyl ether), about 1 micron in thickness. This coating was homogeneous and was present on the entire surfaces of both sides of the Mylar as measured with a micrometer.

EXAMPLE II

A coated Mylar sheet was prepared by repeating the procedure of Example I with the exception that there was selected as the coating solution a 1 percent solution of poly(ethylacrylate) in toluene. There resulted a sheet of Mylar with a coating, 30 milligrams, of poly(ethylacrylate) of about 1 micron, on each side thereof.

EXAMPLE III

There was prepared a coated sheet by repeating the procedure of Example I with the exception that a substrate of poly(vinylchloride) was selected in place of the Mylar, and the solution contained butanol instead of toluene.

EXAMPLE IV

The coated Mylar sheet as prepared in Example I, the total sheet having a thickness of 52 microns, was introduced with a paper backing into a Diablo thermal printer while an image pattern was simultaneously generated by a computer on a donor sheet. The image pattern contained thereon lines and dots. This image pattern was transferred thermally from the donor sheet present in the thermal printer to the coated Mylar sheet.

There resulted, as determined by visual observation, an image pattern of excellent quality in that no pixel deletions occurred, there were clear sharp boundary lines for the entire pattern; and no spots were missing when this image was compared to the initial pattern.

In contrast, when an uncoated 8"×11" Mylar sheet of a thickness of 50 microns was introduced with a paper backing into the thermal printer, and the same image pattern was generated in the Diablo printer, there resulted an image of substantially less resolution; specifically spots were missing, some blurring occurred, and no clear sharp boundary lines of the pattern appeared in comparison to the original pattern.

EXAMPLE V

The poly(vinylchloride) coated sheet as prepared in Example III was introduced into the Diablo thermal printer by repeating the process of Example IV and there resulted images of excellent resolution in that no spots were missing, no deletions occurred, and clear sharp boundaries of the whole pattern resulted in comparison to the original image pattern. In contrast, when uncoated poly(vinylchloride) sheets were introduced into the Diablo thermal printer, no images whatsoever resulted.

EXAMPLE VI

A coated transparency sheet was prepared by repeating the procedure of Example I, with the exception that there was selected a mixture of poly(octadecyl methacrylate), 60 percent by weight, and poly(methyl methacrylate), 40 percent by weight. There resulted a sheet of Mylar, coated on both sides with 30 milligrams, 1 micron in thickness, of the mixture.

This sheet, when introduced into the Diablo printer of Example IV, generated a substantially similar excellent quality image pattern.

Other modifications of the present invention may occur to those skilled in the art based on a reading of the present disclosure, and these modifications are intended to be included within the scope of the present invention.

I claim:

1. A process for obtaining transparencies with an image thereon in thermal transfer printing systems which comprises providing a donor sheet, generating an image on the donor sheet, developing this image, and subsequently transferring the developed image to a transparency comprised of a transparent substrate containing a coating thereover of a polymer selected from the group consisting of poly(vinyl ethers), poly(acrylic acid esters), poly(methacrylic acid esters), and poly(vinylacetate).

2. A process in accordance with claim 1 wherein the coating is selected from the group consisting of poly(octadecyl methacrylate), poly(hexadecyl methacrylate), poly(lauryl methacrylate), poly(isodecyl methacrylate), poly(cyclohexyl methacrylate), poly(hexyl methacrylate), poly(2-ethyl hexyl methacrylate), and poly(phenyl methacrylate).

3. A process in accordance with claim 1 wherein the coating is of a thickness of from about 1 micron to about 2 microns.

4. A process in accordance with claim 1 wherein the coating is poly(methyl acrylate), poly(ethyl acrylate), or poly(isopropyl acrylate).

5. A process in accordance with claim 1 wherein the transparent substrate is a poly(terephthalate).

6. A process in accordance with claim 1 wherein the substrate is of a thickness of about 50 microns to about 180 microns.

7. A process in accordance with claim 1 wherein the coating is applied in a thickness of from about 1 micron to about 2 microns.

* * * * *